April 17, 1945.    A. TOWNHILL    2,373,925
COUPLING SEAL CONSTRUCTION
Filed Aug. 5, 1942    2 Sheets-Sheet 1
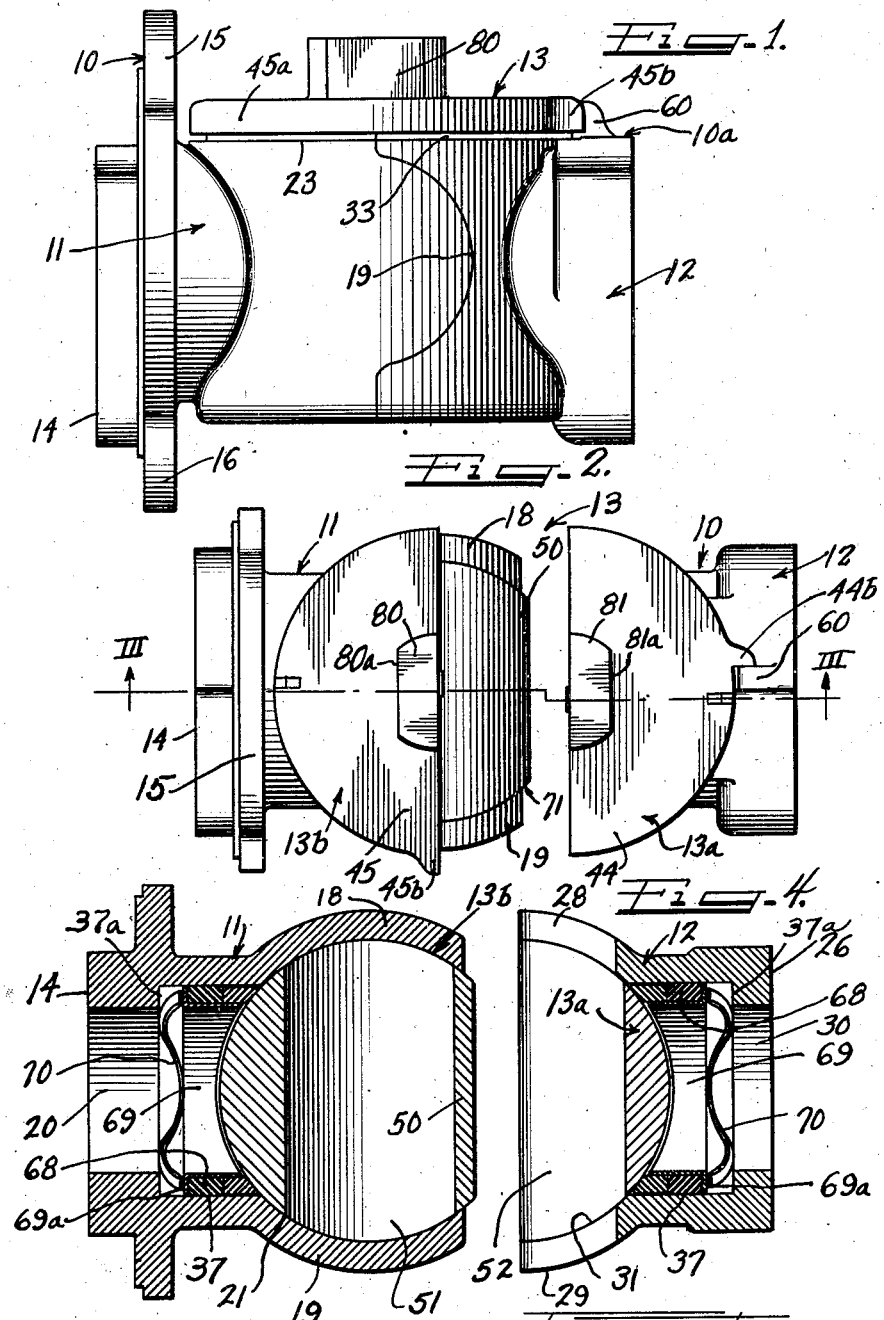
Inventor
ARTHUR TOWNHILL.
by Charles W. Hills Atty.

April 17, 1945.   A. TOWNHILL   2,373,925
COUPLING SEAL CONSTRUCTION
Filed Aug. 5, 1942   2 Sheets-Sheet 2

Inventor
ARTHUR TOWNHILL.
by Charles W. Hills Attys.

Patented Apr. 17, 1945

2,373,925

UNITED STATES PATENT OFFICE 2,373,925

COUPLING SEAL CONSTRUCTION

Arthur Townhill, Cleveland, Ohio, assignor to Thompson Products, Inc., a corporation of Ohio Application August 5, 1942, Serial No. 453,652

4 Claims. (Cl. 284—4)

This invention relates to a seal construction particularly adapted for use with couplings, valves, and the like and more particularly to the construction of a rubber sealing ring so formed as to take into consideration not only the sealing function of the ring but also to give it greater wear-resisting qualities without interfering with the performance of the sealing function.

An object of this invention is to provide a seal construction especially adapted for use in an improved coupling of the type having a split, rotatable plug detachably connecting a pair of coupling boxes for controlling fluid flow therebetween and wherein the heretofore necessary separate end caps for the coupling boxes are eliminated.

Another object of this invention is to provide an improved but simple seal which lends itself to economical manufacture on a large production basis.

A further object of this invention is to provide a seal construction which may be readily assembled in a coupling or the like and in which the parts thereof have been reduced to a minimum.

A still further object of the invention is to provide, in a lightweight disconnect coupling especially adapted for use in airplane fuel oil and hydraulic conduits, an improved seal construction which will be positive in action and which will be resistant to wear.

Yet another object of this invention is to provide a sealing device which on one surface is readily displaceable for sealing engagement and on another surface is made resistant to wear and yet capable, at the same time, of performing effectively a sealing function.

In accordance with the general features of this invention, there is provided in a quick disconnect coupling including a pair of coupling boxes together defining an open-topped closed-bottom valve chamber with a fluid passageway in each part leading to the chamber and a split plug valve mounted in the chamber, improved sealing means in each of the passageways and each having a cylindrically-concave sealing side surface in sealing contact with and conforming to a curved outer surface of the split plug valve.

Still another feature of the invention relates to the provision of novelly arranged spring means for cooperation with the sealing means aforesaid in urging the sealing means into tight sealing engagement with a cylindrical outer surface of the valve plug.

Still another feature of the invention relates to the provision of sealing means comprising a rubber ring having on its inner periphery a liner ring for preventing radially inward displacement of the rubber as it is displaced into sealing position and also having a lateral side provided with a wear-resisting surface and formed cylindrically concave for cooperation with a rotary member, such as a valve plug.

In accordance with still other features of the invention, there is provided a rubber sealing ring made up of a plurality of sections of rubber having different degrees of resiliency, one section being readily displaceable on the outer periphery of the ring for sealing cooperation with a surface to be sealed and the other section being less resilient but having greater wear-resisting characteristics so as to cooperate sealingly with a movable part to be sealed such, for example, as a valve plug.

Other objects and features of this invention will more fully appear from the following detailed description taken in connection with the accompanying drawings, which illustrate several embodiments thereof, and in which:

Figure 1 is a side view of a coupling in which a seal construction embodying the present invention is used;

Figure 2 is a plan view, on a reduced scale, of the structure shown in Figure 1 and showing the coupling boxes detached and separated;

Figure 4 is a cross-sectional view taken on a line IV—IV of Figure 3 looking upwardly;

As shown on the drawings:

Figure 5:
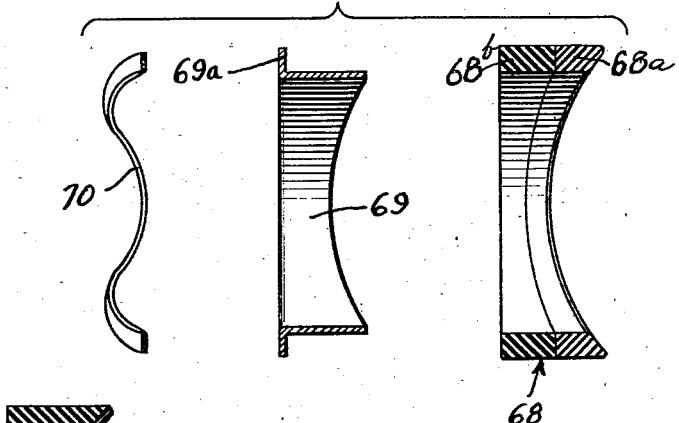
Figure 5 is an exploded view showing the three elements of the seal construction separated from each other.

The reference character 10a designates generally a coupling in which my novel seal construction, illustrated in detail in Figure 5, is usable although it is to be understood that my seal construction may be used in other applications without deviating from the scope and spirit of this invention.

Figure 3:
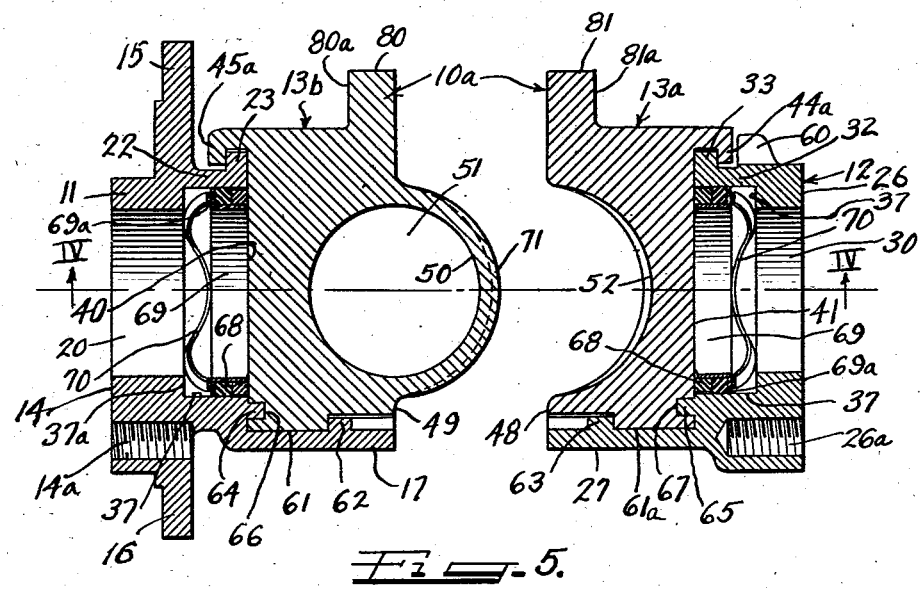
Figure 3 is an enlarged cross-sectional view taken on a line III—III of Figure 2 looking upwardly.

This novel coupling includes cooperable metallic coupling boxes 11 and 12 which may be fabricated in any suitable manner and which define a valve chamber in which is disposed a split rotatable valve or plug designated generally by the reference character 13 and which includes two half-sections 13a and 13b (Figures 3 and 4).

The box 11 has a flat end face 14 which, as shown in Figure 3, may be provided with a plurality of internally threaded holes 14a (only one being shown) for receiving an attachment member (not shown) on the end of any suitable conduit in which the coupling is mounted.

Formed integral with this same end of the coupling are a pair of oppositely-extending flanges 15 and 16 and which are disposed slightly inwardly from the end face 14. It should be noted that these flanges may, if it is so desired, be suitably apertured for the reception of bolts (not shown) for attaching the coupling box to a supporting wall such, for example, as the fire wall of an airplane engine nacelle (not shown).

As best shown in Figure 3, the coupling box 11 has a flat bottom wall 17 projecting from the flange 16. This bottom wall 17 has projecting therefrom segmental cylindrical side walls 18 and 19 (Figure 4). A cylindrical fluid passageway 20 (Figure 4) extends inwardly from the flat end face 14 of the coupling box into an intersecting vertical cylindrical chamber 21 defined by the bottom wall 17 and the curved side walls 18 and 19. Hence it will be appreciated that this intersecting cylindrical chamber has an open top and an open end.

Referring now to Figure 3, it should be noted that the coupling box 11 has a relatively short top wall 22 extending forwardly from the flange 15. The forward end of this wall 22 has an upstanding semi-circular flange 23 spaced from the flange 15 so as to provide therebetween a semi-circular space.

The coupling box 12 has a flat end face 26 (Figure 3) similar to the end face 14 of the box 11 and having a plurality of internally threaded holes 26a (only one of which is shown) extending inwardly therefrom for attachment of the box to a fitting on the end of a conduit. The box 12 also has a flat bottom wall 27 similar to the wall 17 of the box 11. The inner ends of these flat bottom walls 17 and 27 are adapted to be placed in abutting relation, as is clearly evident from Figure 3. The box 12 also has semi-circular walls 28 and 29 similar to the walls 18 and 19 of the box 11. The inner ends of the respective side walls 18 and 28 and 19 and 29 (Figure 14) are adapted to be placed in abutting relation, as is evident from Figure 4.

The box 12 also has a horizontal cylindrical fluid passageway 30 extending inwardly from the flat end face 26 thereof and communicating at its inner end with an intersecting vertical chamber 31 defined by the flat bottom wall 27 and the cylindrical side walls 28 and 29. This chamber 31, like the chamber 21, has an open end and an open top. In fact, the two chambers 21 and 31 cooperate to define a chamber for receiving a rotary valve plug 13 (to be hereinafter described) when the two boxes are joined together.

The box 12, like the box 11, has a short flat top wall portion 32 (Figure 3) forming a top for the inner end of the passageway 30 and having an outturned semi-circular vertical flange or lug 33 therearound.

The passageways 20 and 30 of the coupling boxes 11 and 12 are each counterbored at their inner ends as at 37 (Figure 4) and have shoulders 37a (Figure 3) at the ends of the counterbores. It is in these counterbored portions of the passageways that my novel seal constructions, to be hereinafter described, are mounted.

The coupling boxes 11 and 12, when placed together in abutting relation, define an open-topped cylindrical chamber receiving the cylindrical two-part plug valve 13, as well as define the lateral projecting cylindrical chambers 20 and 30 communicating with the central plug-receiving chamber at their inner ends and adapted to communicate at their outer ends with conduit fittings (not shown) attached to the end faces 14 and 26 of the boxes.

The plug valve has two cooperating cylindrical-like parts 13a—13b having semi-cylindrical side walls 40 and 41, respectively, for bearing engagement with the side walls of the coupling boxes. These side walls 40 and 41 project into grooves 61 and 61a formed in the two boxes 11 and 12. Central upstanding semi-annular flanges 62 and 63 in the respective coupling boxes (Figure 3) define the inner ends of the grooves 61—61a.

Semi-circular tongues 64 and 65 extend inwardly from the cylindrical inner side walls of the coupling boxes near the bottoms 17 and 27 thereof to seat in semi-annular grooves 66 and 67 formed in the side walls of the valve parts 13b and 13a. The valve parts are rotatable in their respective coupling boxes, and once they are seated in these boxes they cannot be lifted out since the tongues 64 and 65 will prevent the valve parts from being lifted away from the bottoms of the coupling boxes.

The coupling box 12 is equipped with an upstanding lug 60 (Figures 1 and 2) for defining an abutment against which ears 44b and 45b on the two valve parts 13b and 13a, respectively, will strike to limit movement of the valve parts to a quarter turn rotation and thereby insure complete coupling and uncoupling of the coupling boxes. It will also be noted that the flange 15 on the coupling box 11 lies in the path of movement of the ears 44b and 45b (Figures 1 and 2) so as to prevent complete seating of the valve part 13a in the coupling box 11 and so as to prevent removal in one direction of the valve part 13b from the coupling box 11 when the coupling is in disconnect position.

Likewise the ear 44b will strike against the lug 60 to prevent removal of the valve part 13a from the box 12 in one direction.

The valve parts 13a and 13b have flat top walls 44 and 45, respectively (Figure 2), projecting beyond the side walls 40 and 41 and have downturned semi-circular flanges 44a and 45a, respectively, for engaging the flanges 33 and 23 of the coupling boxes. It is these top walls 44 and 45 which carry the previously referred to lugs or ears 44b and 45b.

The walls 44 and 45 of the valve parts 13a and 13b have upwardly-extending lugs 81 and 80, respectively, having flat sides 81a and 80a for engagement by a suitable turning tool to rotate the valve parts in the coupling boxes. Also as best shown in Figure 3, the valve parts 13a and 13b have flat inner end faces 48 and 49 extending around the periphery thereof for abutting relation when the coupling boxes are placed together for the coupling operation. The valve part 13b has a cylindrical wall 50 defining a cylindrical chamber 51 therethrough. The valve part 13a is cylindrically recessed as at 52 to receive the wall 50 of the part 13b.

The plug part 13a is operatively mounted in the coupling box 12 by dropping the same between the side walls 28 and 29 (Figure 4) thereof into the groove 61a (Figure 3) in the bottom wall. The plug 13b is inserted in the coupling box 11 in a similar manner. The valve parts are rotated in their respective coupling boxes, and once they are properly seated in these boxes they cannot be lifted out since the tongues 64 and 65 will prevent the valve parts from being lifted away from the bottoms of the coupling boxes.

The present invention is particularly concerned with the sealing means for a coupling of the above described specific characteristics. In Figures 3 and 4 the sealing means is shown in duplicate, there being one for each passageway 20—30. In Figure 5 I have illustrated the sealing means with the components thereof separated for purposes of facilitating a detailed description and illustration of the same. This sealing means comprises a resilient ring 68 preferably composed of a plastic material such as an oil- and solvent-resisting rubber. A metallic liner or retaining sleeve 69 is provided for each rubber ring. This liner also has a radial outwardly-extending flange 69a so that, when the liner is mounted in the rubber ring 68, displacement of the rubber axially outwardly in a direction toward the outer extremity of the cooperating fluid passageway is prevented. In other words, the displacement of the rubber is confined by the liner 69 to the areas to be sealed. Both the liner 69 and the rubber ring 68 are cylindrically recessed on one side to accommodate the cylindrical outer surface of the plug valve part to be fitted therein and sealed thereby. The edge of the liner 69 at its concave side is so cut that it will not scrape against the cylindrical surface of the valve part, as is clear from Figures 3 and 4.

The rubber sealing ring 68, in accordance with the features of this invention, is composed of two sections 68a and 68b, section 68a being of a harder type of rubber than that of 68b so as to be wear-resistant to the movement of the cylindrical valve part thereover. Section 68a, however, is sufficiently resilient so as to maintain a seal at its area of engagement with the cylindrical surface of the valve plug. The two sections 68a and 68b may be suitably secured together as by means of vulcanizing, adhesive, etc.

The third element of the seal comprises a corrugated spring-type ring washer 70 which is adapted to be disposed between the shoulder 37a of the counterbore of the associated fluid passageway 20—30 and the flange 69a of the liner to urge the assembly toward the valve parts.

The liner serves to prevent inward collapsing of the rubber ring or sleeve 68 and whereby the sleeve will effectively form a seal against the adjacent valve part as well as against the counterbore wall since it will be somewhat expanded radially as it is squeezed between the valve parts and the outturned flange of the liner 69.

Figure 6:
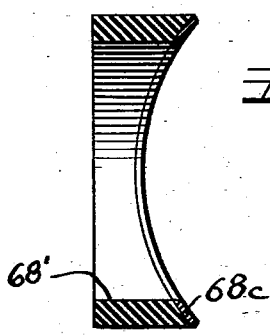
Figure 6 is a cross-sectional view through a modified form of rubber sealing ring embodying the features of this invention.

In Figure 6 there is illustrated a slightly modified form of rubber sleeve 68' which is provided with a cylindrically concave wear-resisting surface formed by a fiber ring 68c suitably fastened to the main body of the rubber sleeve.

From the foregoing it is clear that there is provided a rubber seal which has a readily-displaceable, resilient, peripheral portion for sealing cooperation with the counterbore wall of the fluid passageway, and has a less-resilient, lateral side surface to resist wear incident to the moving of a part thereover while still having a sealing engagement with that part.

In Figure 1 I have illustrated the boxes 11 and 12 and the valve plug 13 in locked cooperation. In Figures 2, 3 and 4 I have illustrated the parts 13a and 13b of the valve 13 rotated to such a position that the boxes 11 and 12 may be separated, and are in fact illustrated as separated in these three figures. To assemble the parts as shown in these three figures, mating faces 48 and 49 of the valve parts are brought into face-to-face engagement with each other, and then a suitable wrench is applied to the cooperating upstanding lugs 80 and 81 for the purpose of rotating the two valve parts 13a and 13b together as a unit. This results in the valve part 13a being moved partially into the box 11, and similarly the valve part 13b is moved into the box 12. This interlocks the two boxes together and also brings the passageway 50 of the valve plug into alignment with the fluid passageways 20 and 30. Further, this rotary movement of the valve plug is limited by the lug 45b striking the upstanding lug 60 on the box 12. This definitely limits the rotation of the valve plug in a counter-clockwise direction to a quarter of a turn, as noted before.

During this rotary movement of the valve plug, it is constantly sealed at both of the passageways or ports 20 and 30 by the seal construction of this invention.

To remove the valve plug parts 13a and 13b from the boxes 12 and 11, respectively, the plug is turned until the valve plug parts are in the positions shown in Figures 2, 3, and 4, at which time the two boxes may be separated. Thereafter, in order to remove the valve plug part 13b from the box 11, it is rotated until the overhanging flange 45a is clear of the semi-circular flange 23. This rotation also disengages the tongue 64 from the semi-annular groove 66. The removal action is the same in the case of plug valve part 13a since rotation of this part will disengage the overhanging flange 44a from the semi-circular flange 33 and will also bring the semi-annular groove 67 out of register with the tongue 65.

It is, of course, clear that after these valve plugs have been removed from the two boxes, access may be had to the seal construction for the purpose of removing the same if it should be necessary to replace the rubber sleeve 68.

From the foregoing description, it is clear that, in the illustrated form of coupling, quarter turn rotation of the valve 13 not only places the passageways 20 and 30 of the boxes in connected relation but also places the passageways of these boxes in full fluid communication. Reverse quarter turn rotation of the plug valve 13 disconnects the coupling boxes and seals the passageways of these boxes so that leakage out of the conduit ends to which the boxes may be attached is prevented. The seals embodying this invention will also serve as brakes resisting unauthorized rotation of the plug valve so that, when the coupling boxes are disconnected, the valve parts retained therein will not move from sealing positions unless intentionally moved to drain positions.

Each coupling box can be cast or forged in one piece. Likewise, each valve part can be cast or forged in one piece so that the total assembly, outside of the seals, is only composed of four main pieces. The arrangement of the grooves and flanges on the respective parts eliminates the necessity for separate end caps or closure plates on the coupling boxes which heretofore had to be assembled on the boxes after the plug parts were inserted.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. In a quick disconnect coupling which comprises a pair of coupling boxes together defining an open-topped closed-bottom valve chamber, each part having a fluid passageway leading to said chamber and a split plug valve mounted in said chamber, sealing means in a passageway and having a cylindrically concave sealing side surface in sealing contact with and conforming to a cylindrical surface of said split plug valve.

2. In a quick disconnect coupling which comprises a pair of coupling boxes together defining an open-topped closed-bottom valve chamber, each part having a fluid passageway leading to said chamber and a split plug valve mounted in said chamber, sealing means in a passageway and having a dished sealing side surface in sealing contact with and conforming to a curved outer surface of said split plug valve, and spring means in said passageway for urging said sealing means into tight sealing engagement with said valve plug.

3. In a quick disconnect coupling which comprises a pair of coupling boxes together defining an open-topped closed-bottom valve chamber, each part having a fluid passageway leading to said chamber and a split plug valve mounted in said chamber, sealing means in a passageway having a curved recessed sealing side surface in sealing contact with and conforming to a curved outer surface of said split plug valve, said sealing means comprising a rubber ring having on its inner periphery a retaining ring for preventing radially inward displacement of the rubber as it is displaced into its sealing position.

4. In a quick disconnect coupling which comprises a pair of coupling boxes together defining an open-topped closed-bottom valve chamber each part having a fluid passageway leading to said chamber and a split plug valve mounted in said chamber, sealing means in a passageway having a dished sealing side surface in sealing contact with and conforming to a curved outer surface of said split plug valve, said sealing means comprising a rubber ring with a cylindrical concave lateral wear-resisting side surface in sealing engagement with said plug and a more readily displaceable resilient outer periphery in sealing engagement with the wall of said passageway.

ARTHUR TOWNHILL.